Patented May 28, 1935

2,002,811

UNITED STATES PATENT OFFICE 2,002,811

CELLULOSE DERIVATIVES CONTAINING AN INORGANIC SUBSTITUENT

Max Hagedorn, Dessau in Anhalt, Otto Reichert, Dessau-Ziebigk in Anhalt, and Eugen Guhring, Dessau in Anhalt, Germany, assignors to I. G. Farbenindustrie Aktiengesellschaft, Frankfort-on-the-Main, Germany, a corporation of Germany No Drawing. Original application April 25, 1927, Serial No. 186,566. Divided and this application October 23, 1929, Serial No. 401,975. In Germany May 1, 1926

6 Claims. (Cl. 260—101)

The present invention relates to new mixed cellulose esters and cellulose ether esters containing in their molecule the residue of an inorganic acid of the group consisting of phosphoric acid, phosphorous acid, silicic acid and boric acid, and to a process of preparing the same.

This application is a division of our co-pending application Ser. No. 186,566, filed April 25, 1927.

The new cellulose derivatives mentioned above are obtainable by treating a compound of the group consisting of such cellulose esters and ethers as contain esterifiable hydroxyl groups with a compound of the group consisting of chlorides, anhydrides, amides and esters of the acids mentioned above, in the presence of a solvent. If desired, the reaction may be carried out in the presence of a material which is capable of promoting the esterification, such as, for instance, pyridine.

Our new process is particularly useful in the further esterification of monoesters, diesters, monoethers, diethers of cellulose and mixtures thereof.

Owing to the presence of hydroxyl groups which have not yet been substituted these compounds when dispersed in an organic medium, e. g., swollen or dissolved in an organic liquid or melt react with the said derivatives of the said inorganic acids whereby cellulose derivatives, particularly mixed cellulose esters and ether-esters are produced which contain several different constituents of which at least one is the residue of an inorganic acid.

It is possible in this manner to introduce the radicles of inorganic acids of the group consisting of boric acid, silicic acid, phosphoric acid and phosphorous acid, into the cellulose molecule. If the reaction is carried out with a mixed acid anhydride different acid radicles can be introduced simultaneously into the cellulose molecule and in this manner various mixed esters and ether-esters of cellulose can be made. A mixed anhydride which can be used is, for example, boroacetic acid anhydride.

The cellulose derivatives obtainable according to our new process are highly valuable in the manufacture of plastic masses, coatings, lacquers, film flowing dopes and artificial threads. They may be employed either alone or in mixture with other cellulose derivatives. Furthermore, any softening agent, pigment or filling material known in the art of cellulose plastics, may be added.

The following examples serve to illustrate the invention:—

*Example 1.*—1200 grams of cellulose acetate (containing 54.5 per cent of combined acetic acid) are dissolved in 10 liters of acetone and the solution is mixed while cooling and stirring well with 250 cc. of phosphorous trichloride in 5000 cc. of acetone. After 5 minutes there are added 800 cc. of pyridine diluted with 1200 cc. of acetone. The whole is then further stirred for 1 hour and water is added to produce a precipitate. By boiling for several hours with repeated renewal of water the product is purified. When dry it is only soluble in acetone when water is added; it is also soluble in mixtures of solvents, such as a mixture of alcohol, benzene, and acetone. In water it swells strongly. It contains 0.5 per cent of phosphorus and 54.5 per cent of combined acetic acid.

By varying the conditions of reaction the content of phosphorus may be considerably increased but only at the cost of solubility.

*Example 2.*—5 grams of silicon tetrachloride, i. e. the acid chloride of orthosilicic acid, are diluted with 10 cc. of chloroform and 7.5 cc. of pyridine are added, while cooling cautiously; the addition product $SiCl_4.4C_5H_5N$ thus formed is well mixed with a solution of 20 grams of ethyl cellulose ether in 200 cc. of xylene. All compounds must be thoroughly dried. After warming for a short time a reaction ensues. The mass solidifies to a stiff jelly. The solvents are driven off by steam, which at the same time decomposes excess of $SiCl_4.4C_5H_5N$. The dried mass is dissolved in benzene and freed from silicic acid by filtration. By several precipitations from benzene by means of petroleum ether the cellulose-ethyl-ether silicic acid ester is purified. It contains 3.8 per cent of combined $SiO_2$, dissolves in benzene and yields a completely clear film.

*Example 3.*—To 500 grams of cellulose acetate (containing 54 per cent of combined acetic acid) swollen in 2000 cc. of heated pyridine are added 1000 grams of monophenyl phosphate. The mixture is boiled for 2 hours. Then the reaction product is precipitated with ethanol and purified by subsequent extraction with ethanol and ethyl ether. The process yields an aceto-phosphate of cellulose containing from 10.8–11 per cent of $PO_4$ which is soluble in mixtures of ethanol, butanol, and acetone, of tetrachlorethane and methanol as well as in a hot mixture of methanol and ethyl acetate.

*Example 4.*—To 450 cc. of xylene are added 85 cc. of pyridine or a mixture of pyridine bases and 53 grams of lauric chloride. 20 grams of cotton are introduced into this mixture heated to 110 to 120° C. This temperature is maintained about 6 hours, then the mass is heated to 140 to 145° C. for another 2 hours until no undissolved particles are present. Then 6 grams of phosphorus oxychloride diluted with 10 cc. of pyridine are added. The mixture is stirred during 2 hours at 110 to 120° C. The cellulose derivative formed is precipitated by the addition of ethanol, extracted several times with ethanol and washed with water during 12 hours at the ordinary temperature. The cellulose laurate phosphate thus resulting contains in the bound state 65.5 per cent of lauric acid and 4.2 per cent of phosphoric acid. It dissolves in chloroform, methylene chloride, xylene, benzene.

Example 5.—150 grams of raw cellulose are treated at the ordinary temperature with 4 kg of a solution of sodium hydroxide of 50 per cent strength, after 2 hours the mass is squeezed until the weight is 425 grams and finely ground. The alkali-cellulose is allowed to stand in a closed vessel at ordinary temperature. It is heated 6 hours at 120° C. in an autoclave with 300 grams of benzene, 70 grams of pulverized sodium hydroxide and 450 grams of ethyl chloride. After cooling 220 grams of benzene and 165 grams of a solution of sodium hydroxide of 40 per cent strength are added and while stirring 80 grams of phosphorus oxychloride diluted by 220 grams of benzene are added drop by drop. The mixture warms gently. After stirring for half an hour it is allowed to settle. The aqueous solution is run away. From the benzene solution all electrolytes are removed by washing with hot water. From the solution by evaporating or by precipitating with benzine, an ethyl cellulose phosphate is obtained in which 5.5 per cent of $PO_4$ are bound. It dissolves in ethanol, ether, benzene, chloroform, ethyl acetate, but is insoluble in benzine.

The term cellulose derivative as used in the specification and the appended claims is intended to comprise cellulose esters and cellulose ether esters.

What we claim is:—

1. The process which comprises treating cellulose ethyl ether with phosphorous oxychloride in the presence of an organic diluent.

2. The process which comprises treating a compound selected from the group consisting of such cellulose esters and ethers as contain esterifiable hydroxyl groups with a compound selected from the group consisting of chlorides of phosphoric acid, phosphorous acid and silicic acid and monophenyl-phosphate, in the presence of an organic diluent.

3. The process which comprises treating a compound selected from the group consisting of such cellulose esters and ethers as contain esterifiable hydroxyl groups with a substantial amount of phosphorous oxychloride in the presence of an organic diluent.

4. The cellulose ether-esters containing in their molecule besides the radical of a monobasic alcohol, the radical of an inorganic acid selected from the group consisting of phosphoric acid, phosphorous acid and silicic acid.

5. The cellulose ether-esters containing in their molecule besides the radical of a monobasic alcohol, the radical of an acid derived from phosphorus.

6. Ethyl cellulose ether phosphate being soluble in ethanol, ether, benzene, chloroform, ethyl acetate, but insoluble in benzine.

MAX HAGEDORN.
OTTO REICHERT.
EUGEN GUHRING.